(12) United States Patent
Masuda

(10) Patent No.: US 10,356,268 B2
(45) Date of Patent: Jul. 16, 2019

(54) IMAGE READING DEVICE

(71) Applicant: KYOCERA Document Solutions Inc., Osaka-shi, Osaka (JP)

(72) Inventor: Masatoshi Masuda, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/710,662

(22) Filed: Sep. 20, 2017

(65) Prior Publication Data

US 2018/0084136 A1 Mar. 22, 2018

(30) Foreign Application Priority Data

Sep. 21, 2016 (JP) ................................. 2016-184525

(51) Int. Cl.
*H04N 1/04* (2006.01)
*H04N 1/00* (2006.01)
(Continued)

(52) U.S. Cl.
CPC ..... *H04N 1/00992* (2013.01); *G03G 15/5012* (2013.01); *G03G 15/60* (2013.01);
(Continued)

(58) Field of Classification Search
CPC .... H04N 1/0092; H04N 1/02855; H04N 1/03; G03G 15/5012; G03G 15/60; G03G 15/607
(Continued)

(56) References Cited

U.S. PATENT DOCUMENTS 4,474,457 A * 10/1984 Phelps ................. G03G 15/605
355/75
4,805,067 A * 2/1989 Amarakoon ....... G03B 27/6257
361/212

(Continued)

FOREIGN PATENT DOCUMENTS

JP 62164339 U 10/1987
JP 08278734 A * 10/1996
(Continued)

OTHER PUBLICATIONS

Japanese Patent Office, Office Action Issued in Application No. 2016184525, dated Apr. 2, 2019, 6 pages.

*Primary Examiner* — Cheukfan Lee
(74) *Attorney, Agent, or Firm* — Alleman Hall Creasman & Tuttle LLP

(57) ABSTRACT

An image reading device includes an image reading unit, a conductive member, a switching portion, and a switching control portion. The image reading unit includes a light emitting portion and a light receiving portion. The light emitting portion irradiates light on a document sheet that is conveyed while in contact with an upper surface of a plate-like contact member. The light receiving portion outputs image data corresponding to light reflected from the document sheet. The conductive member is provided on a lower surface of the contact member. The switching portion is switched between an on-state and an off-state so as to select between a state where the conductive member is grounded or a state where the conductive member is not grounded. The switching control portion controls switching of the switching portion.

4 Claims, 5 Drawing Sheets

(51) Int. Cl.
*G03G 15/00* (2006.01)
*H04N 1/028* (2006.01)
*H04N 1/03* (2006.01)

(52) U.S. Cl.
CPC ....... *G03G 15/607* (2013.01); *H04N 1/02855* (2013.01); *H04N 1/03* (2013.01)

(58) Field of Classification Search
USPC .................. 358/498, 496, 486, 471, 474
See application file for complete search history.

(56) References Cited

U.S. PATENT DOCUMENTS

| | | | | |
|---|---|---|---|---|
| 5,576,804 | A * | 11/1996 | Hakamoto | G03G 15/04 355/30 |
| 6,178,274 | B1 | 1/2001 | Youda et al. | |
| 6,349,155 | B1 * | 2/2002 | Youda | H04N 1/00976 358/474 |
| 7,502,146 | B2 * | 3/2009 | Hanashi | H04N 1/00976 358/474 |
| 7,525,695 | B2 * | 4/2009 | Akaike | G03G 15/605 358/471 |
| 2001/0030776 | A1 * | 10/2001 | Toyoda | G03G 15/605 358/482 |
| 2002/0001105 | A1 * | 1/2002 | Takaki | H04N 1/00909 358/474 |
| 2005/0128536 | A1 * | 6/2005 | Yamanaka | G03G 15/605 358/488 |
| 2006/0050327 | A1 * | 3/2006 | Lim | H04N 1/00976 358/474 |
| 2008/0304093 | A1 * | 12/2008 | Miyake | H04N 1/00 358/1.13 |
| 2010/0142007 | A1 * | 6/2010 | Seto | H04N 1/00572 358/474 |
| 2010/0142010 | A1 * | 6/2010 | Cui | H04N 1/00814 358/497 |
| 2010/0231992 | A1 | 9/2010 | Nomura et al. | |
| 2013/0321881 | A1 * | 12/2013 | Ueda | H04N 1/00557 358/497 |
| 2016/0360046 | A1 * | 12/2016 | Katayama | H04N 1/0057 |
| 2016/0360057 | A1 * | 12/2016 | Ogasawara | H04N 1/00795 |

FOREIGN PATENT DOCUMENTS

| | | |
|---|---|---|
| JP | 10101243 A | 4/1998 |
| JP | H10112771 A | 4/1998 |
| JP | 11261750 A | 9/1999 |
| JP | 2006129430 A | 5/2006 |
| JP | 2010215321 A | 9/2010 |

* cited by examiner

IMAGE READING DEVICE

INCORPORATION BY REFERENCE

This application is based upon and claims the benefit of priority from the corresponding Japanese Patent Application No. 2016-184525 filed on Sep. 21, 2016, the entire contents of which are incorporated herein by reference.

BACKGROUND

The present disclosure relates to an image reading device.

In some image reading devices, an image reading portion including a contact image sensor irradiates light on a reading object, and reads an image based on light reflected from the reading object. In this type of image reading devices, there is known an image reading device that reads an image from a document sheet that is being moved in a state where it is in contact with an upper surface of a contact member.

Meanwhile, in a case where a document sheet is moved in a state where the document sheet is in contact with the upper surface of the contact member, the upper surface of the contact member is electrically charged by friction. There is known an image reading device provided with a charge removal means that removes electric charges generated by frictional charging. In the charge removal means, for example, conductive tape is stuck on the upper surface of the contact member, and the electric charges are removed by grounding the conductive tape.

SUMMARY

An image reading device according to an aspect of the present disclosure includes an image reading unit, a conductive member, a switching portion, and a switching control portion. The image reading unit includes a light emitting portion and a light receiving portion. The light emitting portion irradiates light on a document sheet that is conveyed while in contact with an upper surface of a plate-like contact member. The light receiving portion outputs image data corresponding to light reflected from the document sheet. The conductive member is provided on a lower surface of the contact member. The switching portion is switched between an on-state and an off-state so as to select between a state where the conductive member is grounded or a state where the conductive member is not grounded. The switching control portion controls switching of the switching portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

Figure 1:
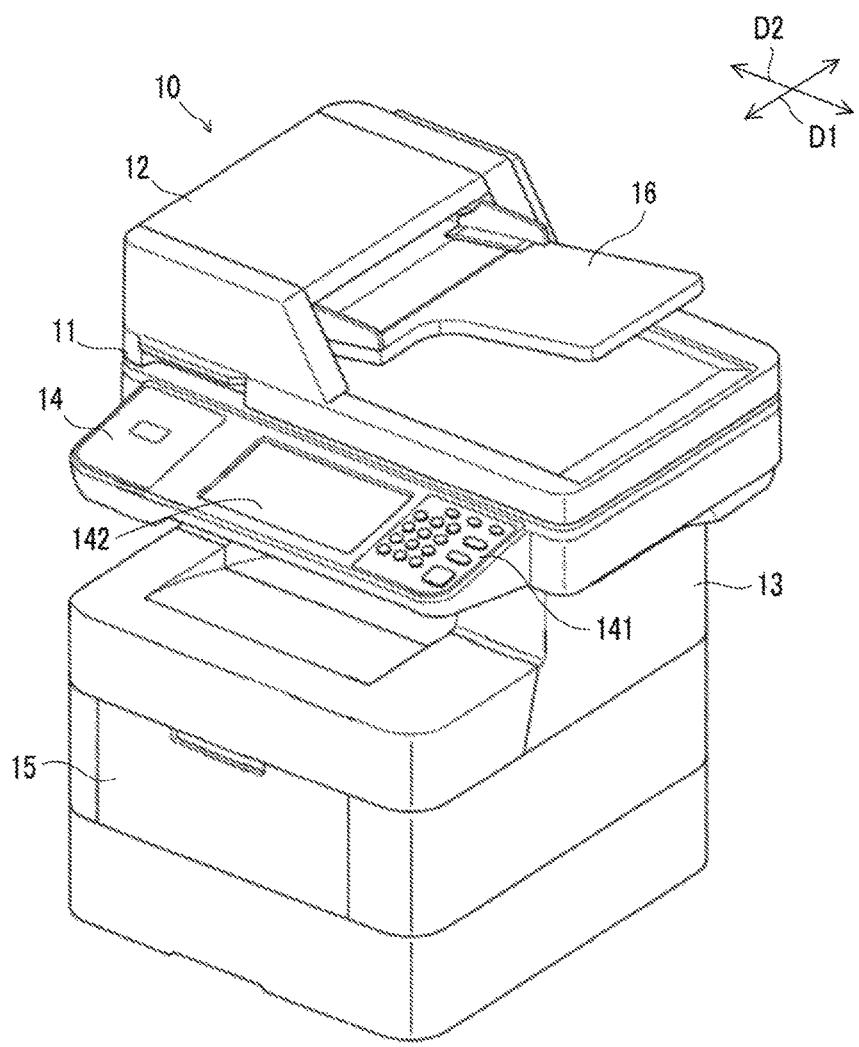
FIG. 1 is a general perspective diagram showing an image forming apparatus according to an embodiment of the present disclosure.

The image forming apparatus 10 shown in FIG. 1 is a multifunction peripheral having a plurality of functions such as an image reading function, a facsimile function, and an image forming function. The image forming apparatus 10 includes an image reading portion 11, an ADF (Auto Document Feeder) 12, an image forming portion 13, an operation/display portion 14, and a sheet feed portion 15. It is noted that although the present embodiment describes the image forming apparatus 10 as an example of the image reading device according to the present disclosure, the present disclosure is not limited to this. For example, the present disclosure is applicable to an image reading device that does not have the facsimile function and the image forming function, and applicable to a facsimile device or a copier that has the image reading function.

Figure 2:
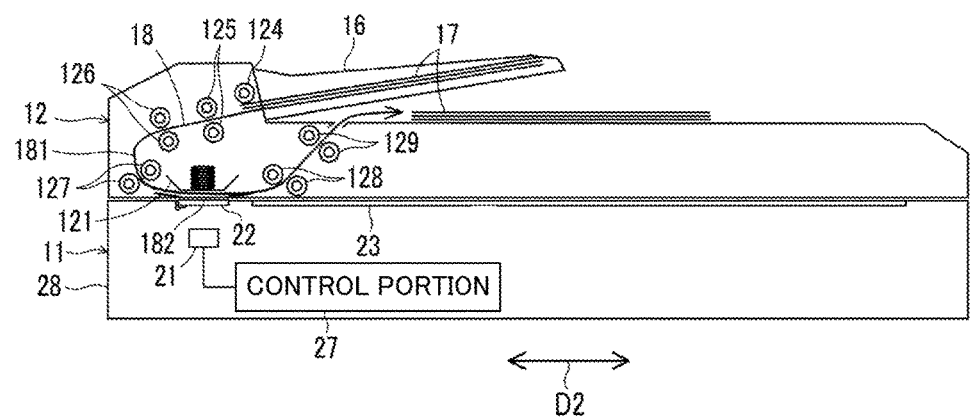
FIG. 2 is a cross-sectional diagram schematically showing an image reading portion of the image forming apparatus shown in FIG. 1.

The image reading portion 11 is provided above the image forming portion 13 and performs an image reading function of reading image data from a document sheet 17 (see FIG. 2). It is noted that the image reading portion 11 is described in detail below.

Figure 3:
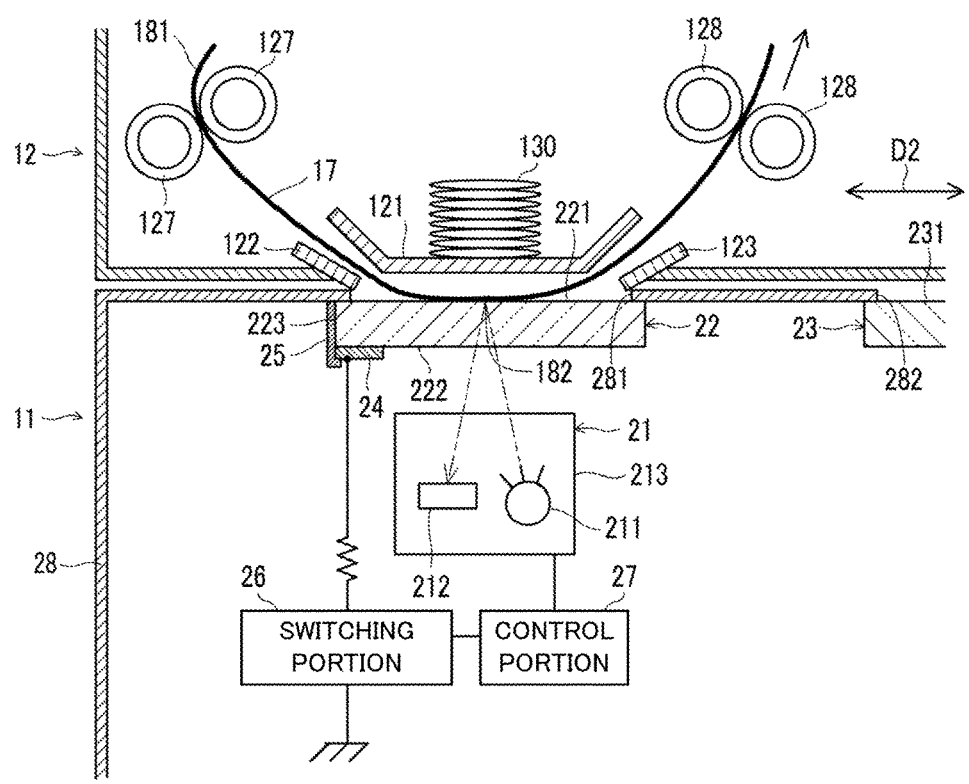
FIG. 3 is a cross-sectional diagram schematically showing a main part of the image reading portion shown in FIG. 2.

As shown in FIG. 2 and FIG. 3, the ADF 12 picks up, one by one, document sheets 17 set on a document sheet setting portion 16, and continuously conveys the document sheets 17 along a conveyance path 18 which is indicated by an arrow in the drawings. This allows the image reading portion 11 to read image data from the document sheets 17 conveyed by the ADF 12. It is noted that each document sheet 17 is conveyed along the conveyance path 18 so as to pass a return portion 181 and a predetermined image reading position 182 in sequence, wherein at the return portion 181, the conveyance direction of the document sheet 17 is reversed. The conveyance path 18 is defined by a document sheet pressing member 121, guides 122 and 123, and a plurality of conveyance rollers 124 to 129. It is noted that the document sheet pressing member 121 is pressed downward by a coil spring 130. With this configuration, the document sheet 17 is made close contact with a first contact member 22 that is described below, at the image reading position 182.

The image forming portion 13 shown in FIG. 1 realizes an image forming function to form an image on a sheet supplied from the sheet feed portion 15. The image forming portion 13 forms a color or monochrome image on a sheet by, for example, an electrophotographic system. In this case, the image forming portion 13 includes an image forming unit, an exposure device, an intermediate transfer belt, a secondary transfer roller, and a fixing device, for example. In addition, the image forming unit includes a photoconductor drum, a charging device, a developing device, a primary transfer roller, and a cleaning device. It is noted that the image forming portion 13 is not limited to the electrophotographic system, but may form an image by another system such as an inkjet system.

The operation/display portion 14 includes an operation portion 141 and a display portion 142. The operation portion 141 inputs various types of information via user operation. The display portion 142 is, for example, a liquid crystal display for displaying various types of information. In the example shown in the drawings, the operation portion 141 has operation keys, but it may have a touch panel or the like.

The sheet feed portion 15 includes a sheet feed cassette and a plurality of conveyance rollers (both are not shown), and supplies sheets stored in the sheet feed cassette to the image forming portion 13. It is noted that the sheets may be, for example, sheets of paper, sheets of coated paper, postcards, envelopes, or OHP sheets.

Figure 4:
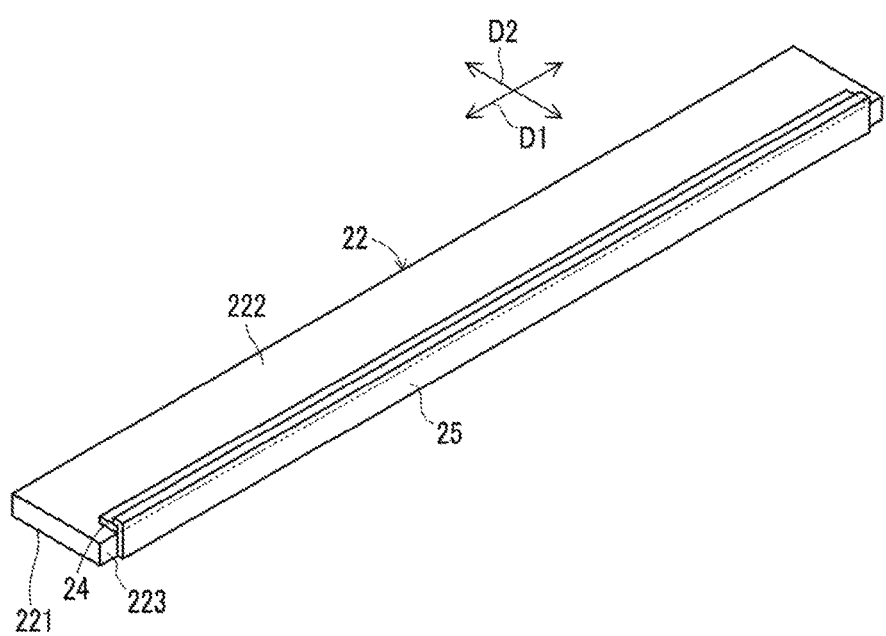
FIG. 4 is a perspective diagram showing a first contact portion of the image reading portion shown in FIG. 2, viewed from below.

Next, the image reading portion 11 is describe in detail with reference to FIG. 3 and FIG. 4. The image reading portion 11 is an example of the image forming apparatus of the present disclosure.

As shown in FIG. 3, the image reading portion 11 includes an image reading unit 21, a first contact member 22, a second contact member 23, a conductive member 24, a lead portion 25, a switching portion 26, and a control portion 27.

The image reading unit 21 reads an image from a document sheet 17 that is being conveyed by the ADF 12 while in close contact with an upper surface 221 of the first contact member 22, or from a document sheet (not shown) placed on an upper surface 231 of the second contact member 23. The image reading unit 21 is configured as a contact image sensor, and includes a light emitting portion 211, a light receiving portion 212, and a carriage 213.

The light emitting portion 211 is controlled by the control portion 27, and emits light linearly to the document sheet 17. The light emitting portion 211 includes, for example, a plurality of LEDs arrayed along a main scanning direction D1. It is noted that the light emitting portion 211 may be configured such that light emitted from a light source is incident from an end of a light guide member, and light is emitted linearly.

The light receiving portion 212 generates an electric signal based on light reflected from the document sheet 17, and outputs the electric signal to the control portion 27 as image data of the document sheet 17. The light receiving portion 212 is, for example, a linear image sensor in which a plurality of photoelectric conversion elements are arrayed along the main scanning direction D1. The photoelectric conversion elements are, for example, photodiodes.

The carriage 213 stores the light emitting portion 211 and the light receiving portion 212. The carriage 213 is configured to be moved reciprocally in a sub scanning direction D2 by a well known moving mechanism that uses a driving device such as a stepping motor. The carriage 213 is stopped at a position that faces the image reading position 182 when reading of an image from the document sheet 17 is not performed, or when reading of an image from the document sheet 17 conveyed by the ADF 12 is performed. On the other hand, when an image is read from a document sheet placed on the upper surface 231 of the second contact member 23, the carriage 213 is moved along the second contact member 23 in the sub scanning direction D2. With the movement of the carriage 213 in the sub scanning direction D2, the whole image reading unit 21 including the light emitting portion 211 and the light receiving portion 212 moves in the sub scanning direction D2. This allows the light emitting portion 211 to irradiate light on the whole document sheet 17. On the other hand, the light receiving portion 212 is configured to obtain image data of the document sheet placed on the second contact member 23 by receiving light reflected from the document sheet 17 while the carriage 213 is moving.

The first contact member 22 is a portion at which light emitted from the light emitting portion 211 of the image reading unit 21 is irradiated toward the document sheet 17 that is being conveyed by the ADF 12. The first contact member 22 is attached to an upper opening 281 of a housing 28, and formed in the shape of a strip that extends in the main scanning direction D1 (see FIG. 4). The first contact member 22 as such is, for example, formed from transparent resin or glass, as a plate that is approximately 5 mm thick. The first contact member 22 is an example of the contact member of the present disclosure.

The second contact member 23 is a portion on which a document sheet is placed when the document sheet is read without using the ADF 12. The second contact member 23 is attached to an upper opening 282 of the housing 28, and formed in the shape of a plate that is larger in size in the sub scanning direction D2 than the first contact member 22. As is the case with the first contact member 22, the second contact member 23 is formed from transparent resin or glass, as a plate that is approximately 5 mm thick.

The conductive member 24 removes electric charges generated on the upper surface 221 of the first contact member 22 due to frictional charging, and removes externally applied static electricity. As shown in FIG. 4, the conductive member 24 is formed to extend in the main scanning direction D1 along a longitudinal edge of a lower surface 222 of the first contact member 22. The conductive member 24 is formed by sticking a metal plate or a metal foil with adhesive, for example. The metal plate or the metal foil is preferably formed from a metal that is highly conductive and excellent in workability. Metals as such include aluminum, gold, silver, copper, and stainless steel. In addition, the conductive member 24 may be formed by film deposition such as metal vapor deposition, or by sticking a metal vapor deposition film.

The lead portion 25 plays a role of guiding electric charges on the upper surface 221 of the first contact member 22 to the conductive member 24. The lead portion 25 is formed on a side surface 223 that continues to the upper surface 221 and the lower surface 222 of the first contact member 22. That is, the lead portion 25 is formed on the side surface 223 that extends along a longitudinal edge of the first contact member 22. The lead portion 25 is in contact with and conductive with the conductive member 24. With this configuration where the lead portion 25 is formed on the side surface 223 of the first contact member 22 so as to be conductive with the conductive member 24, electric charges on the upper surface 221 of the first contact member 22 can be removed effectively by grounding the conductive member 24. In addition, as shown in FIG. 3, with the configuration where the lead portion 25 is formed on the side surface 223, the lead portion 25, covered with the upper wall of the housing 28, is not exposed from the upper opening 281. This reduces the possibility that the user touches the lead portion 25.

It is noted that the lead portion 25 can be formed by the same method as the conductive member 24. In addition, the lead portion 25 may be omitted if, without the lead portion 25, electric charges on the upper surface 221 of the first contact member 22 can be moved to the conductive member 24.

The switching portion 26 selects either a state where the conductive member 24 is grounded or a state where the conductive member 24 is not grounded, by switching between an on-state and an off-state. Here, the conductive member 24 is grounded when, for example, the switching portion 26 is in the on-state. This allows the electric charges on the upper surface 221 of the first contact member 22 to be removed by being moved to the lead portion 25 and then to the conductive member 24. On the other hand, when the switching portion 26 is in the off-state, the conductive member 24 is not grounded, and movement of the electric charges on the upper surface 221 of the first contact member 22 is restricted. It is noted that a known switching element, such as a transistor or a field effect transistor, may be used as the switching portion 26.

Meanwhile, in a case of a conventional electricity removing means in which conductive tape is stuck on an upper surface of the first contact member 22, the user may touch the conductive tape. This may cause static electricity to be applied to the conductive tape from the user, and the static electricity may cause the image reading unit 21 of the image reading portion 11 to malfunction. In addition, there may be a case where static electricity is applied to the conductive tape from the housing 28 of the image reading portion 11. If such an application of static electricity occurs during image reading, electric charges that move during charge removal may turn into noise, and the image reading unit 21 of the image reading portion 11 may malfunction. In the present embodiment, the image reading portion 11 is configured to prevent the image reading unit 21 from malfunctioning.

The control portion 27 includes a CPU, a ROM and a RAM, and comprehensively controls the image reading operation. In addition, the control portion 27 functions as the switching control portion of the present disclosure, and controls the switching portion 26 to switch between the on-state and the off-state. That is, the timing of grounding the conductive member 24 is controlled by the control portion 27. In the present embodiment, during an automatic-reading during which the document sheet 17 is automatically read, the control portion 27 controls the switching portion 26 to switch to the off-state so that the conductive member 24 is not grounded. On the other hand, at a predetermined timing during a non-automatic-reading, the control portion 27 controls the switching portion 26 to switch to the on-state so that the conductive member 24 is grounded. It is noted that the automatic-reading is a time period during which at least one of conveyance of the document sheet 17 by the ADF 12 and reading of an image by the image reading unit 21 is executed. On the other hand, the non-automatic-reading is a time period other than the automatic-reading.

When, for example, the document sheet 17 is conveyed by the ADF 12, the control portion 27 controls the switching portion 26 to switch to the off-state so that the conductive member 24 is not grounded. That is, the control portion 27 performs a control to restrict electric charges accumulated on the first contact member 22 from being removed during conveyance of the document sheet 17. With this configuration, even if excessive electric charges are accumulated on the upper surface 221 of the first contact member 22 during conveyance of the document sheet 17, the excessive electric charges are restricted from moving from the upper surface 221 of the first contact member 22 during conveyance of the document sheet 17.

On the other hand, when, for example, the image reading unit 21 is not performing the image reading operation, the control portion 27 controls the switching portion 26 to switch to the on-state so that the conductive member 24 is grounded. Specifically, either at a timing when the light emitting portion 211 is not irradiating light to the document sheet 17, or at a timing when the light receiving portion 212 is not outputting image data to the control portion 27, the control portion 27 controls the switching portion 26 to switch to the on-state so that the conductive member 24 is grounded.

In addition, on the condition that the number of automatically read document sheets 17 exceeds a predetermined number of sheets, the control portion 27 may control the switching portion 26 to switch to the on-state so that the conductive member 24 is grounded, wherein counting the number is started from a predetermined count start point. In this case, the timing when the control portion 27 controls the switching portion 26 to switch to the on-state is preferably when the document sheet 17 is not automatically read.

The count start point is, for example, a time point when removal of electric charges was performed last time. Specifically, the count start point is either a charge removal start time point when the switching portion 26 was switched from the off-state to the on-state during removal of electric charges performed last time, or a charge removal end time point when the switching portion 26 was switched from the on-state to the off-state during removal of electric charges performed last time.

The predetermined number of sheets is set to such a range that the amount of electric charges accumulated on the upper surface 221 of the first contact member 22 due to the automatic reading of the document sheet 17, does not exceed an amount of electric charges that is assumed to cause a malfunction of the image reading unit 21. It is noted that the amount of electric charges that is assumed to cause a malfunction of the image reading unit 21 varies due to the type of the document sheet 17, the friction resistance of the upper surface 221 of the first contact member 22, the electric resistance of the image reading unit 21, the humidity or the like. As a result, the predetermined number of sheets cannot be determined uniquely, but in general, is set in a range from several sheets to several tens of sheets, and preferably set to a range from five sheets to twenty sheets.

In the following, a description is given of an example of the procedure of a charge removal control process executed by the control portion 27 in the image forming apparatus 10, with reference to the flowchart of FIG. 5. It is noted that in the drawing, steps S1, S2, . . . represent numbers of the processing procedures executed by the control portion 27.

<Step S1>

Figure 5:
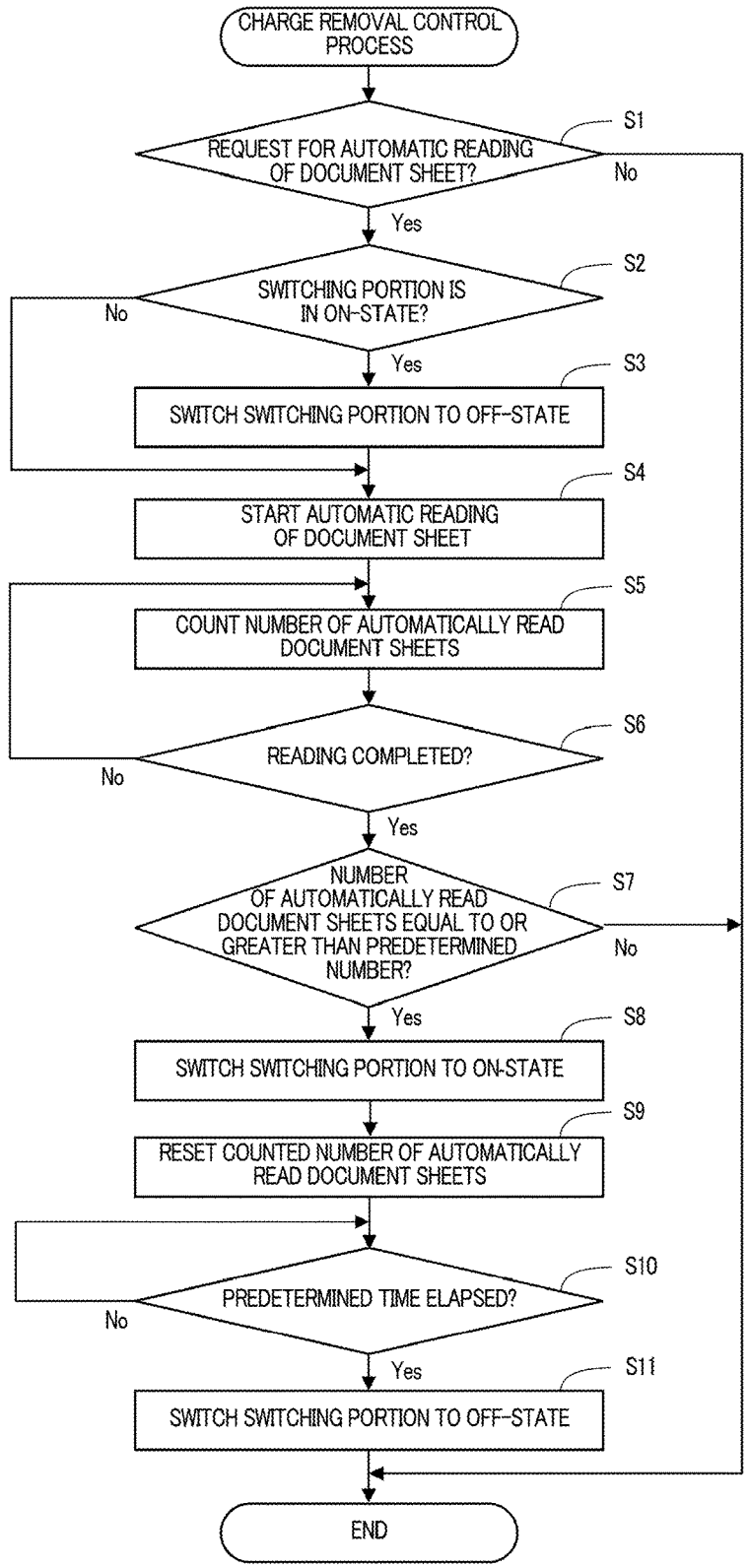
FIG. 5 is a flowchart showing an example of a procedure of a charge removal control process performed by the image reading portion shown in FIG. 2.

First, in step S1 shown in FIG. 5, the control portion 27 determines whether or not there is a request for an automatic reading of the document sheet 17. The request for an automatic reading of the document sheet 17 is input by the user on the movable portion 141 of the operation/display portion 14. It is noted that the automatic reading indicates reading of an image from the document sheet 17 by the ADF 12.

Here, upon determining that there is a request for an automatic reading of the document sheet 17 (step S1: Yes), the control portion 27 moves the process to step S2. On the other hand, upon determining that there is not a request for an automatic reading of the document sheet 17 (step S1: No), the control portion 27 ends the charge removal control process.

<Step S2>

In step S2, the control portion 27 determines whether or not the switching portion 26 is in the on-state. That is, the control portion 27 determines whether or not the conductive member 24 is grounded.

Here, upon determining that the switching portion 26 is in the on-state (step S2: Yes), the control portion 27 moves the process to step S3. On the other hand, upon determining that the switching portion 26 is in the off-state (step S2: No), the control portion 27 moves the process to step S4.

<Step S3>

In a case where the switching portion 26 is in the on-state (step S2: Yes), the conductive member 24 is grounded. As a result, in step S3, the control portion 27 controls the switching portion 26 to switch to the off-state. This makes the conductive member 24 not grounded, and prevents the electric charges accumulated on the upper surface 221 of the first contact member 22 during automatic reading of the document sheet 17 from being removed via the conductive member 24.

<Steps S4 and S5>

In step S4, the control portion 27 starts the automatic reading of the document sheet 17, and upon completion of the automatic reading, counts the number of automatically read document sheets 17, the counting being started from the count start point (step S5). Specifically, the control portion 27 counts the number of automatically read document sheets 17, with the count start point being set to the time when removal of electric charges was performed last time.

<Step S6>

In step S6, the control portion 27 determines whether or not the automatic reading of the document sheet 17 is completed.

Here, upon determining that the automatic reading of the document sheet 17 is completed (step S6: Yes), the control portion 27 moves the process to step S7. On the other hand, upon determining that the automatic reading of the document sheet 17 is not completed (step S6: No), the control portion 27 repeatedly executes the processes of steps S5 and S6 until it determines that the automatic reading of the document sheet 17 is completed (step S6: Yes).

<Step S7>

In step S7, the control portion 27 determines whether or not the number of automatically read document sheets 17 is equal to or greater than the predetermined number of sheets.

Here, upon determining that the number of automatically read document sheets 17 is equal to or greater than the predetermined number of sheets (step S7: Yes), the control portion 27 moves the process to step S8. On the other hand, upon determining that the number of automatically read document sheets 17 is smaller than the predetermined number of sheets (step S7: No), the control portion 27 ends the charge removal control process.

<Steps S8 to S11>

In step S8, the control portion 27 controls the switching portion 26 to switch to the on-state. That is, the control portion 27 makes the conductive member 24 grounded, and removes, via the conductive member 24, the electric charges accumulated on the upper surface 221 of the first contact member 22. Subsequently, the control portion 27 resets the counted number of automatically read document sheets 17 (step S9), and on the condition that a predetermined time elapses (step S10: Yes), controls the switching portion 26 to switch to the off-state, then ends the charge removal control process (step S11). It is noted that the predetermined time is a time period for which the conductive member 24 is grounded, and is set to a range from 0.01 second to 1 second.

In the image forming apparatus 10, the conductive member 24 is formed on the lower surface 222 of the first contact member 22. As a result, unless the image reading portion 11 is dismantled, the user cannot touch the conductive member 24. This makes it possible to prevent the image reading unit 21 of the image reading portion 11 from malfunctioning due to a touch to the conductive member 24 by the user. In addition, in the image forming apparatus 10, the control portion 27 controls the switching portion 26 so as to select either a state where the conductive member 24 is grounded or a state where the conductive member 24 is not grounded. As a result, in the image forming apparatus 10, it is possible to control the switching portion 26 to select a timing to remove the electric charges accumulated on the upper surface 221 of the first contact member 22. For example, when the automatic reading of the document sheet 17 is performed, the switching portion 26 is switched to the off-state to make the conductive member 24 not grounded. This prevents the electric charges accumulated on the first contact member 22 from moving during the automatic reading of the document sheet 17. With this configuration, it is possible to prevent the image reading unit 21 from malfunctioning due to movement of electric charges on the first contact member 22 during automatic reading.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
an image reading unit including a light emitting portion and a light receiving portion, the light emitting portion irradiating light on a document sheet that is conveyed while in contact with an upper surface of a plate-like contact member, the light receiving portion outputting image data corresponding to light reflected from the document sheet;
a conductive member provided on a lower surface of the contact member;
a lead portion provided on a side surface of the contact member continuing to the upper surface and the lower surface of the contact member, an upper end of the lead portion not protruding from the upper surface of the contact member, and a lower end of the lead portion being in contact and conductive with the conductive member;
a switching portion configured to be switched between an on-state and an off-state so as to select between a state where the conductive member is grounded or a state where the conductive member is not grounded; and
a switching control portion configured to control switching of the switching portion, wherein
when the document sheet is conveyed, the switching control portion controls the switching portion to the state where the conductive member is not grounded, and
when the image reading unit is not reading the document sheet, the switching control portion controls the switching portion to the state where the conductive member is grounded.

2. The image reading device according to claim 1, wherein
when the light emitting portion is not irradiating light on the document sheet, the switching control portion controls the switching portion to the state where the conductive member is grounded.

3. The image reading device according to claim 1, wherein
when the light receiving portion is not outputting image data, the switching control portion controls the switching portion to the state where the conductive member is grounded.

4. The image reading device according to claim 1, wherein
on a condition that a number of read document sheets that has been counted from a predetermined count start point, exceeds a predetermined number of sheets, the switching control portion controls the switching portion to switch to the state where the conductive member is grounded.

\* \* \* \* \*